United States Patent
Covert et al.

[11] Patent Number: 5,878,729
[45] Date of Patent: Mar. 9, 1999

[54] AIR CONTROL VALVE ASSEMBLY FOR FUEL EVAPORATIVE EMISSION STORAGE CANISTER

[75] Inventors: Charles Henry Covert, Manchester; Kenneth William Turner, Webster; Thomas Charles Meiller, Pittsford, all of N.Y.

[73] Assignee: General Motors Corporation, Detroit, Mich.

[21] Appl. No.: 73,419

[22] Filed: May 6, 1998

[51] Int. Cl.⁶ .................................................. F02M 37/04
[52] U.S. Cl. .......................................... 123/520; 123/516
[58] Field of Search ..................... 123/520, 516, 123/518, 519, 521, 198 D

[56] References Cited

U.S. PATENT DOCUMENTS

| | | | |
|---|---|---|---|
| 4,703,736 | 11/1987 | Atkins | 96/144 |
| 5,295,472 | 3/1994 | Otsuka et al. | 123/520 |
| 5,383,437 | 1/1995 | Cook | 123/520 |
| 5,398,660 | 3/1995 | Koyama | 123/519 |
| 5,437,257 | 8/1995 | Giacomazzi | 123/520 |
| 5,462,100 | 10/1995 | Covert et al. | 141/59 |
| 5,474,050 | 12/1995 | Cook | 123/520 |
| 5,509,395 | 4/1996 | Cook | 123/520 |
| 5,590,634 | 1/1997 | Shinohara | 123/520 |
| 5,635,630 | 6/1997 | Dawson | 123/520 |
| 5,669,362 | 9/1997 | Shinohara et al. | 123/520 |
| 5,685,285 | 11/1997 | Ohtani | 123/520 |
| 5,727,530 | 3/1998 | Honda | 123/520 |
| 5,803,054 | 9/1998 | Yamazaki | 123/519 |

*Primary Examiner*—Carl S. Miller
*Attorney, Agent, or Firm*—Patrick M. Griffin

[57] ABSTRACT

An air control valve assembly for the air side of an automotive fuel evaporative emission control system incorporates two passive check valves and an active blocking valve which cooperate to divide the air filtered air inlet path from the air exit path to atmosphere. The possibility of break through vapors flowing back into the air cleaner during canister vapor fill is avoided through the use of oppositely opening check valves. By adding an active blocking valve below the freely movable air inlet check valve, the canister can be rigorously sealed from the atmosphere during a diagnostic evacuation test.

4 Claims, 4 Drawing Sheets

AIR CONTROL VALVE ASSEMBLY FOR FUEL EVAPORATIVE EMISSION STORAGE CANISTER

This invention relates to automotive evaporative emission control system storage canisters in general, and specifically to a multi purpose air control valve for such a canister that combines an air inlet, air outlet, and diagnostic seal in one valve assembly.

BACKGROUND OF THE INVENTION

New American automobiles have incorporated fuel vapor storage canisters for some time now, originally designed simply to capture fuel vapor that would otherwise have vented from the tank while it was capped. Lately, the same canisters have also been used to capture fuel vapor displaced while the tank is uncapped and being filled with liquid fuel. Regardless of source, the stored fuel vapors are purged from the canister while the engine is running, typically by a vacuum (negative pressure air flow) applied to the canister, which pulls outside air in and through the activated carbon bed of the canister to desorb previously stored fuel vapors. The desorbed vapor is ultimately pulled into the engine air induction system and burned. The process is reversed when vapors enter the canister from the fuel tank, with clean air being expelled to the outside atmosphere. Older canister designs generally incorporated a single, common port to atmosphere that provided both the outside air inlet for purge and the clean air exit for fuel adsorption. Such older designs also typically had the single atmospheric inlet/exit port located at one end of the canister, with the fuel vapor inlet and purge ports located at the opposite end. Newer canister designs often divide the activated carbon bed roughly in half with a flow division baffle, and locate the purge and fuel vapor ports on one side (vapor side) of one canister end, and the common atmospheric air inlet/exit port on the other side (air side) of the same end.

While most disclosed canister designs show the air inlet/exit port as opening directly to atmosphere, it has also been suggested for some time that the common port run through a filter. Such a filter would be useful for cleaning the atmospheric air that was pulled into the canister during purge, but of no real use for filtering the air vented to the outside during fuel adsorption, when it would merely serve as an air flow impediment. It has also been known for sometime to use the engine air cleaner housing as a convenient filter for the inlet air, since it is a filter that already exists. However, with a common inlet/exit port, fuel vapors could be inadvertently fed into the air cleaner during vapor fill of the canister, if the carbon bed's capacity were exceeded and vapors "broke through". This could lead to an over rich fuel air mixture being fed to the engine at start up.

To solve this problem, it has been proposed to divide the single air inlet/air exit port into two separate valved ports, each spring biased closed in opposite directions. An inlet port allows outside air to be pulled only through the air cleaner during purge, and the exit port allows air (and any excess break through fuel vapor) to vent directly to atmosphere, rather than to the air cleaner. An example may be seen in U.S. Pat. No. 5,590,634, in FIG. 2 thereof. A so called "atmospheric valve 18" incorporates a single valve housing at the top of the air side of the canister. An air inlet port 18a is closed by a diaphragm 18b loaded thereagainst by a compression spring 18c. An air inlet line 18e from air cleaner 3 connects to the air inlet port 18a across the diaphragm 18b. An oppositely spring loaded check valve 19a in the same housing opens directly to atmosphere. The spring 18c loading the diaphragm 18b down to block the air path to the air cleaner 3 must be stronger than the spring loaded check valve 19a, in order to allow air any break through vapor to pass only through valve 19a to atmosphere, and not to air cleaner 3. Consequently, during purge, in order to successfully pull the diaphragm 18b open, a separate pipe 18g must be provided to route some of the negative pressure from the purge port back behind the diaphragm 18b to overcome the spring 18c and allow air inlet flow to begin from the air cleaner 3. So, the strength of the spring 18c represents a compromise between certain purge air entry from the air cleaner and certain exit of venting air to the atmosphere only, without reverse flow back to the air cleaner.

An even more recent development in fuel vapor control systems has been the requirement for so called "on board" or self-contained, automatic diagnostic programs to periodically assure that the systems are working as intended. Testing the system against external air leaks is an important part of that assurance. Generally, this involves sealing off any check valve type air inlets to the fuel tank, or canister, or both at once, with solenoid operated blocking valves. Next, purge vacuum is applied to the canister create a known level of negative pressure, and then measuring the pressure again at a set time interval later to see whether it has been sufficiently retained. This indicates no serious air leaks. In the system disclosed in U.S. Pat. No. 5,590,634 noted above, the diaphragm 18b alone is relied upon to block the air inlet to the canister during diagnostic evacuation. As a consequence, the level of negative pressure that can be applied and retained by the canister is effectively limited by the setting pressure of the diaphragm valve 18b, that is, by the strength of the spring 18c. A negative pressure greater than the strength of spring 18c, since it is deliberately routed around and behind the diaphragm 18b to open it during the normal purge operation, will also overcome spring 18c and open it during diagnostic evacuation, and thereby pull outside air back into the canister. This leak will continue until the negative pressure falls low enough to allow the spring 18c to push the diaphragm 18b closed again.

SUMMARY OF THE INVENTION

The invention provides an atmospheric air control valve for a vapor storage canister that separates the air inlet path from the air cleaner and the air exit path to atmosphere, but which is not limited, during diagnostic evacuation, by the strength of a spring loaded check valve. Instead, an actively operated blocking valve creates a solid canister seal during diagnostic evacuation, while still allowing for an efficient vapor purge and vapor fill process.

In the preferred embodiment disclosed, a canister body carries both a purge and vapor inlet port on the top end of the vapor side of the canister. An air control valve housing opens through the top end of the air side of the canister. The housing has an air exit port direct to atmosphere, and an air inlet port routed from the air cleaner, both of which open to the canister carbon bed across a common lower passage. The air exit port is closed by a lightly spring loaded diaphragm, exposed to atmosphere on the spring side and to internal canister pressure on the seal side. The air inlet port is closed and opened by a free swinging, light flapper door, which allows free air flow in from the air cleaner, but quickly blocks any reverse flow from the canister to the air cleaner. Interposed between the flapper door and the common passage is a solenoid operated plunger, capable of solidly blocking the air inlet path to the air cleaner independently of the flapper door, but which is normally open.

During normal purge, vacuum applied to the canister depresses the internal canister pressure below atmospheric pressure, keeping the air exit blocking diaphragm solidly closed, in cooperation with its spring. The light flapper door easily open to allow outside air in from and through the air cleaner, which desorbs fuel vapors from the bed. During fuel vapor fill, a fuel vapor and air mixture flows in from the fuel tank. The canister internal pressure is elevated slightly above atmosphere, easily opening the lightly spring loaded diaphragm to allow cleaner air, free of fuel vapor, to exit directly to atmosphere. The flapper door swings shut to block any possible vapor flow back to the air cleaner.

During diagnostic evacuation of the canister body for external leak check, the on board control system closes the normally open solenoid plunger, solidly sealing any possible outside air inflow from the air cleaner. The other possible leak path is passively closed by the spring loaded diaphragm, and evacuation only assists in that seal. The canister and fuel tank together can be evacuated to any desired level of negative pressure, because of the solid seal of the plunger, and the level of negative pressure not limited to just the setting pressure of a spring loaded check valve.

BRIEF DESCRIPTION OF THE DRAWINGS

These and other features of the invention will appear from the following written description, and from the drawings, in which.

DESCRIPTION OF THE PREFERRED EMBODIMENT

Figure 1:
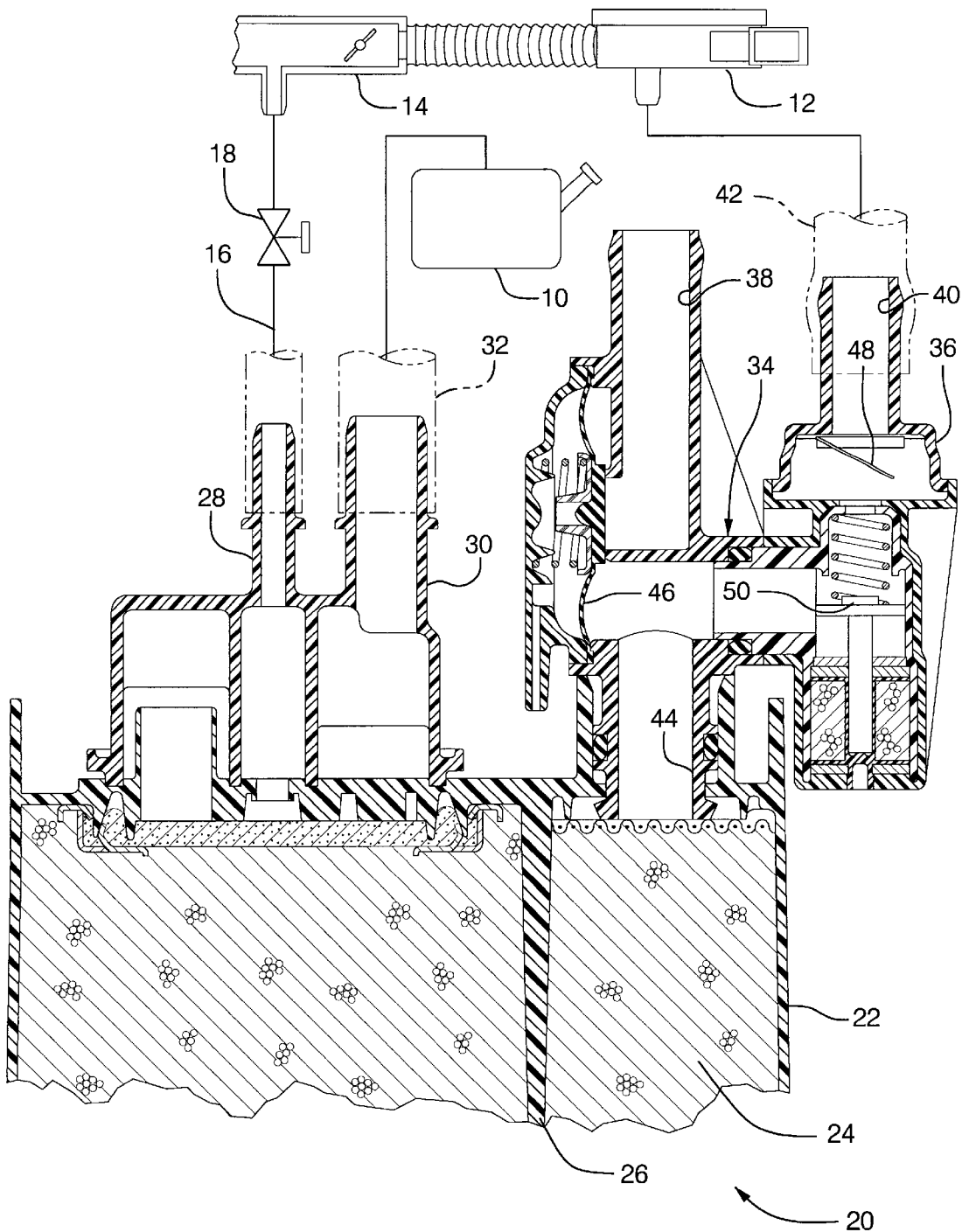
FIG. 1 is a cross section through a canister incorporating the invention, schematically indicating a fuel tank, purge line and purge control valve, and air cleaner and throttle body, in a static condition.

Referring first to FIG. 1, a typical vehicle has a fuel tank 10 and a filtered air cleaner 12 upstream in the engine air induction system. Downstream of the air cleaner 12, a throttle body 14 provides a negative pressure to a purge line 16, opened and closed by a purge control valve 18. The control valve 18 is opened by the vehicle engine control system at such time as engine speed a fuel demand are sufficient to allow previously stored fuel vapors to be pulled off and burned. These are stored in a canister, indicated generally at 20, which has a hollow canister body 22 containing an activated carbon bed 24 that separates the fuel vapor component from a mixture of air and fuel vapors fed thereto from tank 10. The carbon bed 24 is divided by a flow baffle 26 into what may be generally denoted as an air side of the canister 20, on the right in FIG. 1, and a vapor side on the left. This designation indicates that fuel vapor is both fed to, and pulled from, the fuel side of the canister body 22, while air is concurrently either expelled to atmosphere from, or pulled from atmosphere into, the air side. The fuel vapor and air sides of the canister body 22 are both ported at the top, or at one common end, whatever its orientation may be. The vapor side of canister body 22 has a conventional purge port 28 connected to the purge line 16, which is next to a fuel vapor port 30, but separated therefrom by a series of internal baffles. Fuel vapor port 30 is connected by a vapor line 32 that runs to the vapor dome of fuel tank 10. When closed, fuel tank 10 is sealed from atmosphere, but for the connection through vapor line 32 into canister body 22. The various structures and components of canister 20 described so far are basically conventional. Details of the novel air control valve of the invention are described next.

Still referring to FIG. 1, a preferred embodiment of the air control valve assembly of the invention is indicated generally at 34. The upper end of the air side of canister body 22 carries a valve housing 36, which contains the other various cooperating components the valve assembly 34. Valve housing 36 is formed with an air exit port 38 open to atmosphere and an air inlet port 40 connected by an air inlet line 42 to the air cleaner 12. Both ports 38 and 40 open into a common lower passage 44 that is open to the carbon bed 24. The path between the carbon bed 24 and the exit port 38 is closed or opened by a passively acting check valve in the form of a spring loaded diaphragm 46. The rear, spring side of diaphragm 46 is vented to atmosphere, while the front, seal side is exposed to the internal pressure within housing 36 and canister body 22. The spring load on diaphragm 46 can be, and is, very light, just enough to keep it lightly loaded into the sealed position shown. Therefore, the diaphragm 46 can open whenever the canister internal pressure exceeds atmospheric pressure plus the small compression spring force, but will remain tightly closed whenever the internal pressure is even slightly under atmospheric. The path between the carbon bed 24 and the air inlet port 40 is closed or opened by a passively acting check valve in the form of a light, free swinging flapper door 48. Door 48 can swing shut easily to stop any flow from the carbon bed 24 through the air inlet port 40, but opens just as easily to allow flow in the other direction. Finally, an active or powered blocking valve in the form of a solenoid plunger 50 is mounted within housing 36, below the flapper door 48. Plunger 50 is normally open, but when powered, it blocks the path to the inlet port 40, independently of flapper door 48, for a purpose described below.

Figure 2:
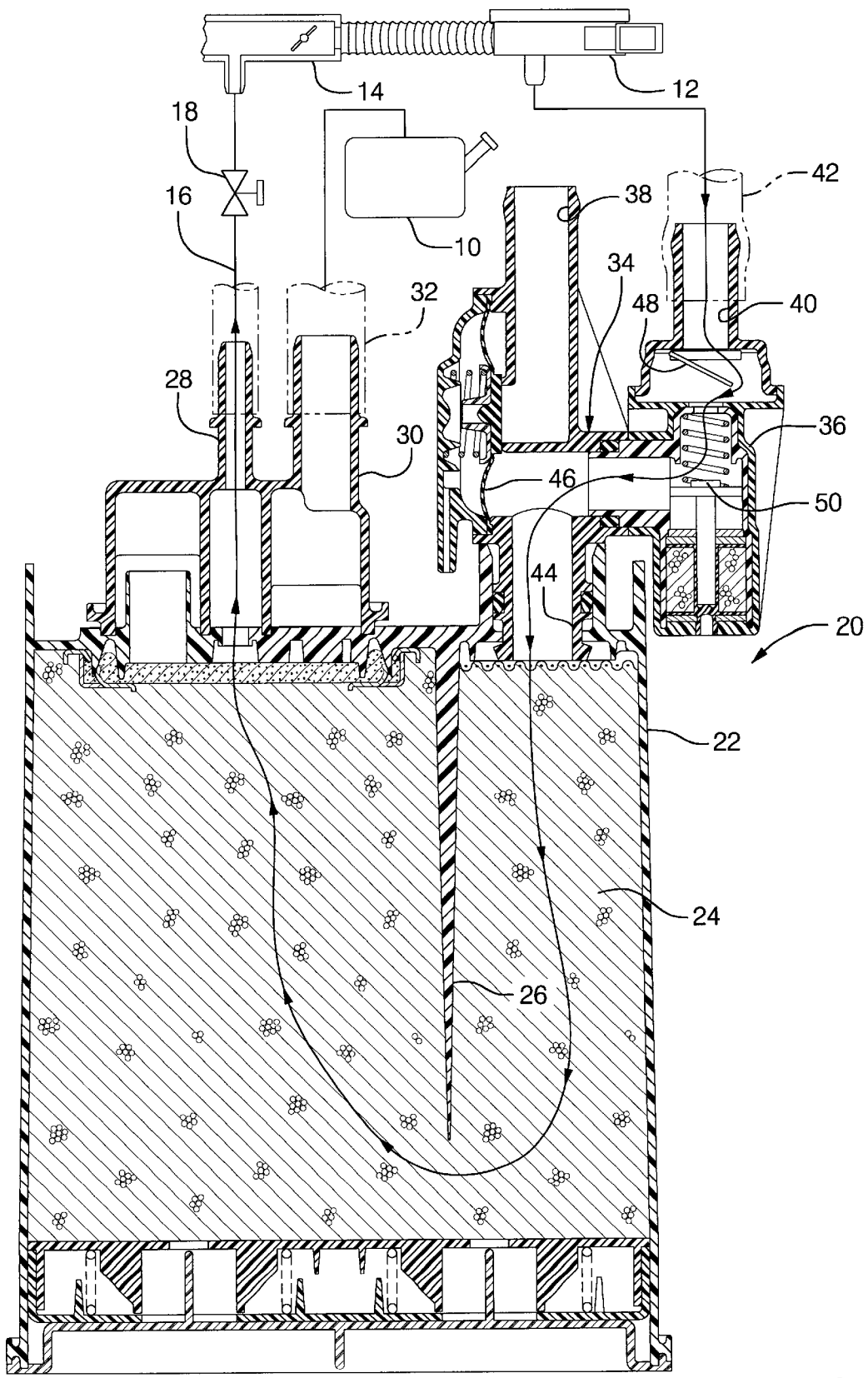
FIG. 2 is a view like FIG. 1, but showing the purge process.

Referring next to FIG. 2, the purge process is illustrated. Carbon bed 24 stores fuel vapors adsorbed whenever a mixture of vapor and air flows out of tank 10, since vapor line 32 is the only possible vent for such. When the engine is up to speed and the vehicle computer control system judges that the capacity exists to burn stored fuel vapor, the purge control valve 18 is opened, exposing the vapor side of canister body 22 to vacuum from the throttle body 14, through the purge line 16. Accordingly, a negative pressure appears at the opening of the purge port 28 to the top of the carbon bed 24, on the vapor side thereof. In general, canister body 22 is sealed from atmosphere at all points, but for the air inlet port 40. Specifically, the air exit port 38 is tightly sealed by the diaphragm 46, pushed closed by the combination of light spring pressure and negative internal pressure. While the fuel tank 10 is open to the interior of the canister body 22, tank 10 has no openings to atmosphere but for those in the canister body 22. Therefore, the interior of tank 10 will be evacuated, through vapor line 32, by the negative pressure within canister body 22 until that negative pressure is higher than the flow resistance through the carbon bed 24. Then, as illustrated by the arrows in FIG. 2, flow from the tank 10 will stop, and outside air will instead be drawn in from air cleaner 12, through line 42 and inlet port 40, past the open flapper door 48 and normally open plunger 50 and through the common passage 44 into carbon bed 24. The outside air from air cleaner 12 will be pre filtered and relatively free of contaminants. The drawn in air flows down and through the carbon bed 24, around the baffle 26 in the U pattern shown, desorbing fuel vapors from the bed 24 along the way. Flowing air and entrained desorbed fuel vapors ultimately flow out purge port 28 and into the throttle body 14, where they are burned.

Figure 3:
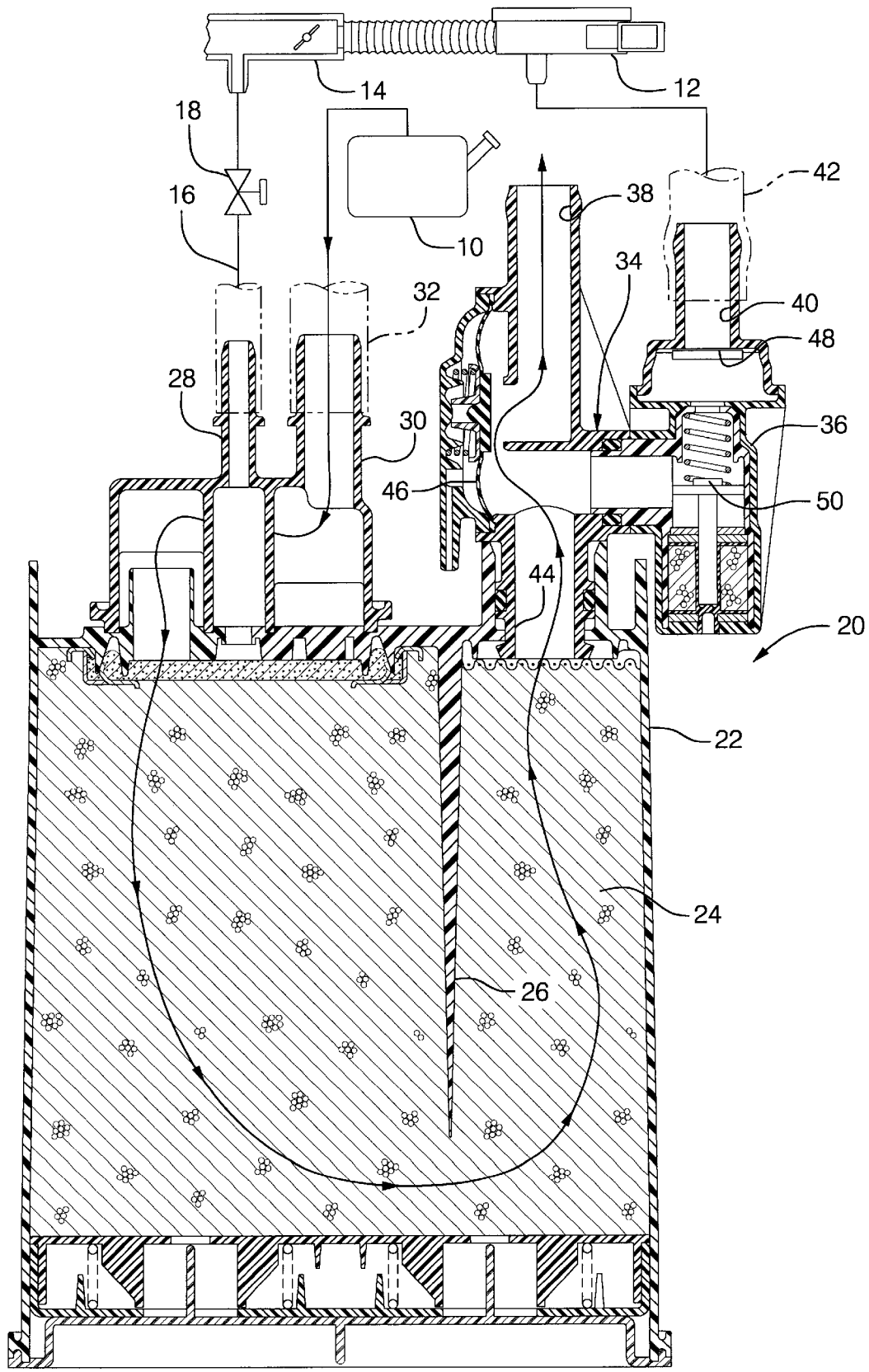
FIG. 3 is a view like FIG. 1, but showing the canister as its carbon bed is being vapor filled.

Referring next to FIG. 3, the vapor fill process that precedes the just described purge process is illustrated. When the engine is not running (or whenever it is determined that the capacity does not exist to burn vapor), the purge valve 18 is closed, and the plunger 50 is open. If fuel tank 10 heated to a significant extent, either by ambient temperature or the return of hot fuel to the tank, its internal pressure caused by warm air and vaporized fuel rises above atmospheric pressure. Again, its only vent path out is through the open vapor line 32 and vapor port 30 into the vapor side of the carbon bed 24. Likewise, if the tank 10 is being filled with liquid fuel, the same vent path exists, which is necessary to allow liquid fuel to enter. A mixture of air and fuel vapor expelled from tank 10 flows down through the carbon bed 24, in a reverse of its purge flow path. The interior of canister body 22 is concurrently raised at least slightly above atmospheric pressure, which is more than sufficient to open the diaphragm 46 against its weak spring force, allowing flow out the exit port 38 to atmosphere. The flow out of exit port 38 will, under normal circumstances, be basically clean air, with all of the fuel vapor component having been adsorbed by the carbon bed 24. However, in the event that the bed 24 becomes overloaded, no break through fuel vapor will back flow through air inlet port 40 and into the air cleaner 12, because the flapper door 48 easily closes to prevent any such flow. There is no need to close the normally open plunger 50 to block such back flow to air cleaner 12.

Figure 4:
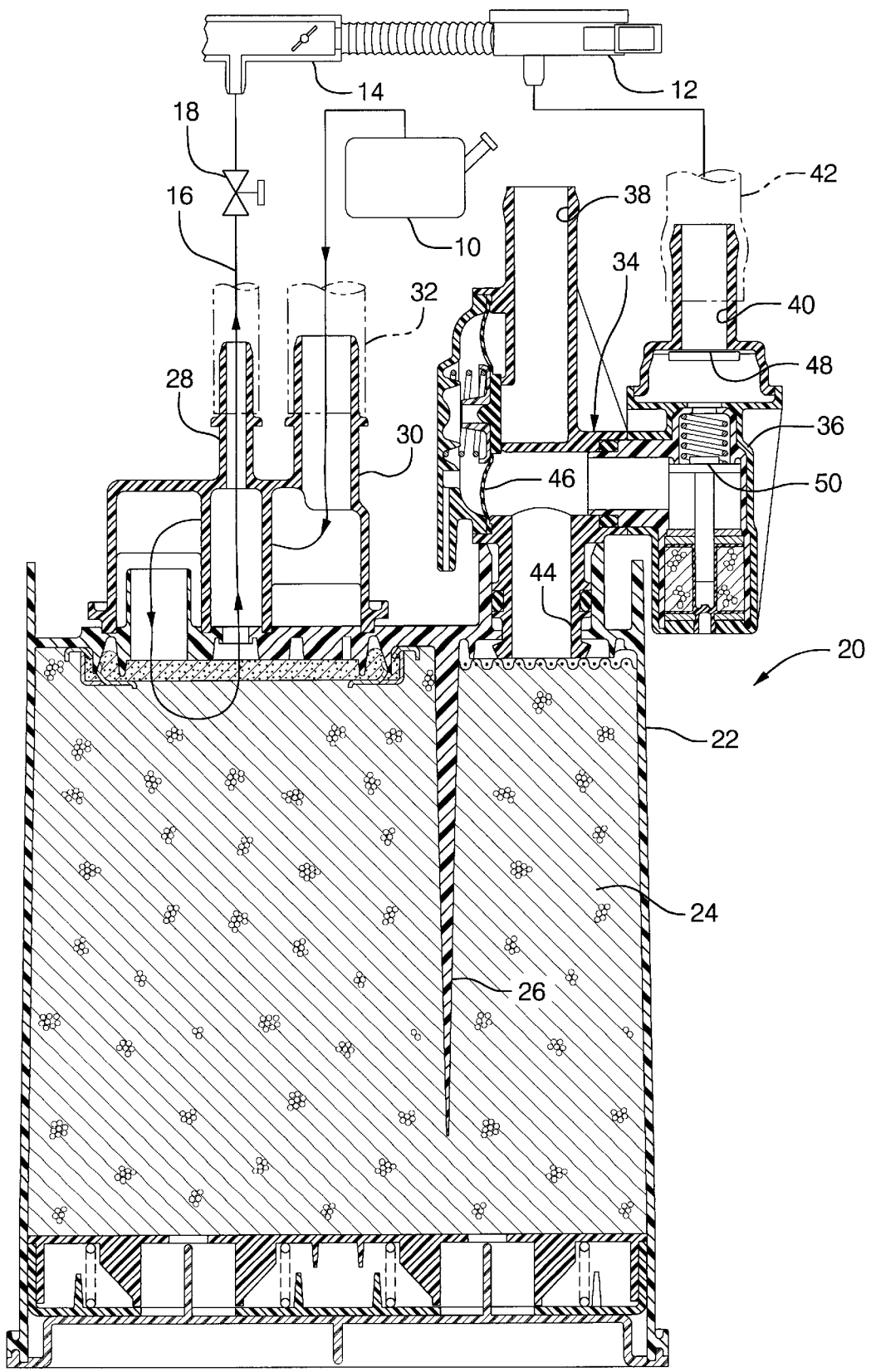
FIG. 4 is a view like FIG. 1, but showing the canister and tank being commonly evacuated during an on board diagnostic leak test.

Referring finally to FIG. 4, when it is desired to check the canister body 22 and fuel tank 10 for external air leaks, the on board self diagnostic program embedded in the vehicle's electronic controller energizes the solenoid plunger 50 to close it, solidly blocking the air inlet port 40 against any inflow of outside air. The only other possible outside air inflow point is the exit port 38, which is solidly closed by the diaphragm 46. Then, purge control valve 18 is opened, and purge vacuum applied to purge port 28, drawing air and vapor out of both tank 10 and canister body 22 until the two together attain a desired level of negative pressure below atmospheric pressure. The negative pressure that can be applied is not limited by the setting pressure of any check valves, because of the solid closing of the plunger 50 that blocks inlet port 40 independently of the free swinging flapper door 48. Then, as determined by the diagnostic program, the purge valve 18 is closed, and the internal pressure of canister 22 and tank 10 is monitored at a set time interval later by any suitable pressure sensor in the system, not illustrated. If the negative pressure is sufficiently maintained for a sufficient time interval, it is determined that there are no significant external air leaks into the system.

Variations in the preferred embodiment's structure could be made. The diaphragm valve 46 could be replaced by a simpler type of spring loaded check valve, such as a ball, but the diaphragm design is preferable in that exposes a large working surface area to the canister internal pressure. Likewise, the non spring loaded, one way flapper door 48 could be replaced by some other fast acting, freely opening and closing valve, such as a duck bill valve or the like. It need have no particular setting pressure, as a spring loaded check valve would have, since it is independently back up by the solenoid plunger 50. The plunger 50 could also be replaced by some other active, movable solid sealing member, which could actually be located in the line 42 and above the door 48, so long as it was normally open. However, it is very convenient to locate it within the same housing 36.

We claim:

1. In a vehicle having a fuel tank, a filtered engine air cleaner, a controllable source of purge vacuum, and a bifurcated fuel vapor adsorbing canister, a vapor side of which canister is selectively opened to either purge vacuum to desorb fuel vapors or to the fuel tank to adsorb fuel vapors, and an air side of which is concurrently selectively opened to either inlet air so as to allow the purge vacuum to desorb fuel vapors or opened to atmosphere so as to allow air to exit the canister and thereby allow fuel vapors to be adsorbed, an air control valve assembly for the air side of the canister that controls both the selective opening to inlet air and atmosphere as well as allowing the canister and fuel tank to be commonly sealed from atmosphere for the diagnostic application of purge vacuum to the fuel tank and canister, said valve assembly comprising in combination, a valve housing having an air exit port open to atmosphere, an air inlet port opening into the air cleaner, with both air ports opening across a single common passage into the air side of the canister, a passive, spring loaded check valve in the valve housing separating the air exit port from the common passage and having a compression spring loaded side vented to atmosphere and a sealing side exposed to the internal canister pressure so as to open when the canister internal pressure exceeds atmospheric pressure plus the compression spring force, and so as to remain closed when the canister internal pressure is lower than atmospheric pressure, a passive, one way check valve in the housing separating the air inlet port from the common passage, and acting to freely allow air flow from the air cleaner through to the common passage but to quickly block reverse air flow, and an active blocking valve separating the air inlet port's check valve from the common passage, so as to selectively block and unblock the air inlet port from the common passage independently of the inlet port's passive one way valve, whereby, when purge vacuum is applied to the vapor side of the canister and the canister internal pressure is reduced below atmospheric pressure, the active blocking valve can be held open, allowing free air flow from the air cleaner, through the air inlet port, through the passive one way valve, and through the common passage into the canister, while the spring loaded check valve remains firmly closed, and when purge vacuum is inactive, the active blocking valve can be held open, allowing fuel vapors from the fuel tank to flow freely into the vapor side of the canister until its internal pressure exceeds atmospheric pressure plus the exit port's check valve spring force, thereby opening the check valve, but closing the one way valve, so as to allow free air flow out of the canister, through the common passage and through the exit port to atmosphere, but not through the one way valve and inlet port to the air cleaner, and when diagnostic vacuum is applied to the vapor side of the canister, the active blocking valve can be closed, thereby solidly sealing the air side of the canister from the air inlet port, so that the interior of the canister and fuel tank can be commonly evacuated to a desired level to check for external air leaks.

2. An air control valve assembly according to claim 1, further characterized in that the active blocking valve comprises a solenoid plunger located within the valve housing and below the one way check valve.

3. An air control valve assembly according to claim 1, further characterized in that the passive, spring loaded check valve comprises a spring loaded diaphragm with its sealing surface area exposed to the canister internal pressure.

4. An air control valve assembly according to claim 1, further characterized in that the passive, one way check valve comprises a free swinging flapper door.

* * * * *